US007924580B2

(12) United States Patent
Glaser et al.

(10) Patent No.: US 7,924,580 B2
(45) Date of Patent: Apr. 12, 2011

(54) SWITCHING INVERTERS AND CONVERTERS FOR POWER CONVERSION

(75) Inventors: John Stanley Glaser, Niskayuna, NY (US); Juan Manuel Rivas Davila, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 46 days.

(21) Appl. No.: 12/549,433

(22) Filed: Aug. 28, 2009

(65) Prior Publication Data

US 2011/0051473 A1   Mar. 3, 2011

(51) Int. Cl.
*H02M 3/335* (2006.01)
(52) U.S. Cl. ............................ 363/24; 363/25
(58) Field of Classification Search ............... 363/24, 363/25, 22, 23
See application file for complete search history.

(56) References Cited

U.S. PATENT DOCUMENTS

| 4,016,479 | A | | 4/1977 | Reible |
| 4,454,574 | A | | 6/1984 | Bush |
| 4,460,949 | A | | 7/1984 | Steigerwald |
| 5,073,849 | A | * | 12/1991 | Morris ..................... 363/21.03 |
| 5,327,337 | A | | 7/1994 | Cripe |
| 2007/0171680 | A1 | | 7/2007 | Perreault et al. |

OTHER PUBLICATIONS

Juan M. Rivas et al, "A High Frequency Resonant Inverter Topology with Low-Voltage Stress", IEEE Transactions on Power Electronics, vol. 23, No. 4, Jul. 2008, pp. 1759-1771.
Juan M. Rivas et al, "A Very High Frequency dc-dc Converter Based on a Class Φ Resonant Inverter", Power Electronics Specialists Conference, 2008, PESC 2008 IEEE, Jun. 15-19, 2008, pp. 1657-1666.
Juan M. Rivas et al, "New Architectures for Radio-Frequency DC-DC Power Conversion", IEEE Transactions on Power Electronics, vol. 21, No. 2, Mar. 2006, pp. 380-393 .
Pilawa-Podgurski, R.; Sagneri, A.D.; Rivas, J.M.; Anderson, D.I.; Perreault, D.J., "Very-High-Frequency Resonant Boost Converters" Power Electronics, IEEE Transactions on , vol. 24, No. 6, Jun. 2009, pp. 1654-1665.
Pilawa-Podgurski, R.C.N.; Sagneri, A.D.; Rivas, J.M.; Anderson, D.I.; Perreault, D.J.; "Very-High Frequency Resonant Boost Converters" Power Electronics Specialists Conference, 2007, PESC 2007, IEEE Jun. 17-21, 2007 pp. 2718-2724.
Phinney, J.W., Perreault, D.J. & Lang, J.H., "Radio-Frequency Inverters With Transmission-Line Input Networks" IEEE Transactions on Power Electronics, vol. 22, No. 4, Jul. 2007, pp. 1154-1161.

* cited by examiner

*Primary Examiner* — Shawn Riley
(74) *Attorney, Agent, or Firm* — Scott J. Asmus

(57) ABSTRACT

A switching inverter having two single-ended $EF_2$ inverter sections coupled together with a shared ground and partially shared tunable resonant network that is coupled to at least one load, wherein each inverter section comprises a switching section, and wherein the shared tunable network section allows independent tuning of an impedance seen by the corresponding switching section thereby independently tuning even and odd harmonics of the switching frequency.

21 Claims, 9 Drawing Sheets

SWITCHING INVERTERS AND CONVERTERS FOR POWER CONVERSION

BACKGROUND

With the vast proliferation of electronic devices of increasing complexity, there is a continual effort to augment the power conversion circuitry. Two of the main types of power conversion circuitry are power amplifiers and power converters. Power amplifiers are widely used in telecommunication and industrial applications and have found use as the front-end stage in high performance dc-dc converters. Depending on their mode of operation, power amplifiers can be classified in two families, namely linear power amplifiers and switched mode amplifiers. Linear power amplifiers are commonly used because of their simplicity, linearity, and good dynamic performance. They are designed with active gain device, usually a transistor, operating in the "linear region" a condition that results in significant quiescent power dissipation. The relatively poor efficiency of linear power amplifiers makes them better suited for applications where linearity is important and the ensuing power losses are manageable.

Switched-mode amplifiers operate with the transistor either fully "on" or "off", using the transistor effectively as a switch. Switched-mode power amplifiers are relatively efficient and find use in applications where higher efficiency is critical to meet power density, power consumption, or size requirements.

It is generally understood that the difference between an amplifier and an inverter is that an amplifier has a port for an input signal, which in this discussion is an AC input, and converters energy from a DC power source into an AC output. An inverter is simply an amplifier with a self-contained AC signal source to be amplified and delivered to the output. Finally, if the AC output of an inverter is rectified, i.e. converted back to DC, the complete system functions as a DC-DC converter. For illustrative purposes, the description herein basically applies to the cases of amplifiers, inverters, and when rectifiers are included, DC-DC converters.

The vast majority of dc-dc power conversion circuits utilise inductors and capacitors in conjunction with switches to efficiently process electrical power. It is known that higher switching frequency reduces the size and value of the passive components. However, such high frequency operation tends to decrease the efficiency, and there are various soft switching techniques that have been developed to reduce the losses associated with the switching. The soft switching converters for the dc-dc power conversion application typically have an inverter section that converts the ac power that is then processed to generate the required dc power, typically by a rectifier section. In addition to dc-dc converters, other high frequency applications employing resonant inverters include radio frequency (RF) power amplifiers for usage in such fields as healthcare technology and communications.

An operational principle of efficient power conversion is the periodic controlled storage and release of energy, wherein the average flow of power from one port to another is regulated. In principle, power processing thus accomplished is lossless, and in practice, low losses can be achieved. One of the main contributors to the volume of a power processing circuit is the required energy storage, wherein the storage is typically implemented with capacitors and inductors. For a given energy storage technology, the size of the energy storage elements is usually a monotonic increasing function to the energy to be stored. Thus, increases in power density require either reduction in energy stored or increases in energy storage density. The latter is heavily dependent on physics and material science, and furthermore appears to be subject to fundamental limitations such as breakdown voltage and permittivity for capacitors, and saturation flux density and permeability for inductors. Improvement in the material properties of magnetic and dielectric components is a relatively slow process. The alternative is to reduce the required amount of stored energy per operating cycle. For a circuit processing a specified amount of power, this is accomplished by increasing the switching frequency.

Up to a point, increased switching frequency yields increases power density, however as switching frequency continues to increase, issues arise which detract from these gains. These issues include increased switching losses, proximity losses and core losses in magnetic components, and problems with parasitic reactances. While these can be mitigated to some extent, the inefficiency issues tend to dominate the converter design, and further increases in switching frequency increase cost and losses with no attendant increase, or even a decrease, in power density.

In the HF and VHF range, which is defined as being in a range from a few MHz to a few hundred MHz, inverters and rectifiers typically employ soft switching for both turn-on and turn-off, so that switching losses are kept at acceptable levels. The most common inverter topologies used in the HF or VHF band are either based on class D, E, or DE topologies. According to the conventional definition, Class D does not guarantee soft-switching on all transitions, while Class E and DE topologies are distinguished by the use of resonant waveforms and switch transition timing such that all switching transitions are soft, and that any anti-parallel diodes of switches do not conduct. The latter means that reverse recovery losses may be neglected. In Class DE, peak voltage stresses on the switches are advantageously limited to the bus voltage, but driving a high-side switch with the precise timing required becomes difficult as the frequency increases beyond 10 MHz-20 MHz. This is primarily due to common-mode currents in the high-side gate drive. Class E avoids this condition via the use of a single-ended ground-referenced switch, but the trade-off is high device voltage stress. Furthermore, class E and DE inverters are characterized by a relationship between active switch capacitance, switching frequency, and processed power. This relationship severely constrains the practical design space for these inverters, thereby limiting their application.

For switched-mode power amplifiers to operate at frequencies in the HF, VHF, or higher frequency ranges, resonant elements are typically used to bring the switch voltage close to zero right before the switching transition. This condition is normally called Zero-Voltage-Switching (ZVS). ZVS transitions effectively remove the energy that otherwise would be wasted in the semiconductor every switching cycle. A further reduction in switching losses can be achieved by delaying the voltage rise on the transistor as the latter is turned off, thus preventing substantial voltage and current from being impressed in the transistor simultaneously. This is usually accomplished via capacitance across the switch terminals, which generally included the inherent switch capacitance present in all practical switches. It is this same capacitance that necessitates the use of ZVS as described above.

A drawback of many switched-mode resonant inverters is the large voltage (or current) the transistor has to withstand as a result of the resonant process. For example, the Class-E inverter is a well-known switched-mode power amplifier that imposes a high peak voltage across the transistor. Specifically, the transistor sees a voltage reaching nearly four times the input voltage for the standard design.

The class $\Phi_2$ inverters are soft switching inverters adapted for high switching frequencies. Also known as Class $EF_2$ inverters, they operate by allowing control of the fundamental switching frequency and the second and third harmonics. They share the soft-switched behavior and the ground-referenced transistor of Class E designs, but have greatly reduced voltage stress and additional design freedom. This allows the class $EF_2$ inverter to have an enlarged design space, and in particular, allows a class $EF_2$ inverter of given input and output current and voltage and a given transistor technology to operate at higher frequency than class E, thus reducing the passive component size.

FIG. 1 is a prior art illustration that shows a class $EF_2$, or equivalently a class $EF_2$ inverter stage 10 as a switched-mode resonant inverter employing a switch $Q_1$, a passive multi-resonant network comprising $L_1$, $C_1$, $L_2$, $C_2$, and a load network $L_3$, $C_3$, and a load impedance $Z_{LD, SE}$. The switch $Q_1$ is turned 'on' and 'off' on a periodic basis with switching frequency FS via switch drive signal $v_D(t)$. The combination of the multi-resonant network, the load network, and the load impedance creates the impedance $Z_{Q1}$ as seen by the switch $Q_1$. The exact characteristic of $Z_{Q1}$ required for proper inverter operation is known, but a useful description is that the impedances at FS and its harmonics are defined to provide both the desired power to the load, and to provide soft switching of the switch $Q_1$. The soft switching behavior allows efficient operation at very high switching frequencies, much higher that practical with standard pulse width modulation (PWM) switching conversion techniques. It is also noted that under periodic steady-state conditions, the values of $Z_{Q1}$ at $F_S$ and its harmonics are the only ones of significance for operation.

Parasitic components often limit the performance of conventional designs operating at high frequencies. For example, the parasitic output capacitance of the transistor $Q_1$ typically limits the maximum frequency at which a conventional class E inverter will operate for a given output power. The $EF_2$ inverter of FIG. 1 overcomes this by providing an extra degree of design freedom, which in turn allows a greater value of transistor capacitance and thus extends the upper end of the operating frequency. Note that the capacitor $C_1$ in FIG. 1 includes this transistor parasitic output capacitance.

A salient characteristic of class EF-type converters is that the voltage across the transistor, $v_{Q1}(t)$, during the off-state is determined by the impedance values of $Z_{Q1}(f)$ at the fundamental, second and third harmonic of the switching frequency $F_S$. Specifically, the low impedance value needed at the second harmonic of the switching frequency is obtained by the addition of a series resonant trap formed by $L_2$ and $C_2$ in FIG. 1. Components $L_1$ and $C_1$ play a major role in setting the impedance $Z_{Q1}(f)$ at the fundamental and third harmonic, and $C_1$ also contributes a decrease in $Z_{Q1}$ for higher harmonics. This ensures zero voltage switching (ZVS) conditions and helps absorb the transistor capacitance, which is included in $C_1$. The impedance $Z_{Q1}$ plays a role in the wave shaping of the voltage $v_{q1}(t)$, as well as controlling the power flow from the DC input to the AC output.

The waveshaping reduces the voltage stress across the transistor on the order of 40% as compared to the Class-E. Reducing the peak voltage allows the use of lower voltage semiconductors with better conduction characteristics, and this reduces losses in the inverter, thereby increasing efficiency and allowing higher power density.

Referring to FIG. 2, the simulated impedance $Z_{Q1}(f)$ across the transistor $Q_1$ of the $EF_2$ inverter during the off state of the converter is shown for gain 50 and phase 60. The fundamental switching frequency $F_S$ in this example is 30 MHz. The low impedance at the second harmonic (60 MHz) is easily seen. Note that for periodic steady-state operation, only the impedance at multiples of the switching frequency $F_S$ are of importance.

The complex impedance $Z_{Q1}(f)$ seen at the fundamental switching frequency $f=F_S$ and its second and third harmonics ($f=2F_S$ and $f=3F_S$) are important to the operation of the $EF_2$ inverter. The value at $f=F_S$ sets both the power level and the ZVS behavior. The values at $f=2F_S$ and $f=3F_S$ set the shape of the transistor waveform and thus are essential to reducing the transistor voltage stress. In particular, the low impedance at the second harmonic and the relative relationship between the values at fundamental and third harmonic are necessary to produce the quasi-trapezoidal drain waveform characteristic of proper operation.

The complex impedance $Z_{Q1}(f)$ is produced by the network $L_1$, $C_1$, $L_2$, $C_2$, $L_3$, $C_3$, and the load impedance $Z_{LD,SE}$. The component values must be adjusted, or "tuned" to get the desired impedance values. The difficulty arises in that some of the component values are not adjustable or are non-linear, e.g. the portion of $C_1$ that represents transistor $Q_1$ output capacitance. Therefore, an exact prediction of the required values is not possible. Once initial values are chosen, the component values are tuned either in hardware, in simulation, or in both, in order to get proper operation. This becomes quite difficult because any single component value affects the value of the complex impedance $Z_{Q1}(f)$ at the fundamental switching frequency $f=F_S$ and its second and third harmonics ($f=2F_S$ and $f=3F_S$). Thus, adjusting one component can require that all other components are adjusted, and so forth. This typically requires a great many iterations to come to an acceptable solution, and is both difficult and time-consuming.

Comparing to the class E, the $EF_2$ inverter achieves a significant reduction in semiconductor voltage at the expense of more resonant components one of which (capacitor $C_2$ in FIG. 1) is rated to almost three times the input voltage.

In dc-dc converter applications, a suitable rectifier capable of operation at high frequency replaces the load. Among the resonant rectifiers topologies commonly used in these applications is the single-diode topology shown in FIG. 3. This single diode rectifier is designed to look resistive at the fundamental frequency, with an input impedance $Z_{LD, SE}$, so that it may be substituted for the load in FIG. 1. This condition is achieved by resonating the parasitic diode capacitance with a resonant inductor, which also provides the required dc-path for the DC output current.

When this rectifier is connected to the inverter of FIG. 1 in place of the load $Z_{LD,SE}$, the resonant rectifier sees a mostly sinusoidal input current. The voltage $v_{ld,se}(t)$ has a significant harmonic content, but the fundamental component of such voltage is in phase with the current supplied by the inverter. This condition is desirable, but maintained over a narrow output power operating condition.

FIG. 4 shows the simulated input voltage $v_{ld,se}(t)$ 400 of the properly tuned resonant rectifier of FIG. 3 and its fundamental component 410.

Referring to FIG. 5, the graph shows the simulated rectifier voltage fundamental component 500 and the input current 510. These waveforms 500, 510 are both are in phase, thereby implying a resistive behavior.

As known in the art, inverters are circuits that convert dc to ac. Note that the same circuits can also be used as amplifiers if the control signal operating the active switch is considered to be an ac input to be amplified. Also note that by adding a resonant rectifier to the output of the inverter, the inverter ac output is converted to a dc output, thereby causing the entire system to operate as a dc-dc converter. Thus, the inverters have great flexibility and depending upon the design criteria such devices are utilised in many different applications.

As noted, electronic devices generally require some type of power conversion in order to operate and there is always a need for greater efficiency and control of the power conversion. Furthermore, there is a continual objective of providing greater functionality in a smaller form factor and the power conversion techniques are desired. Various efforts have been used to improve upon the deficiencies in the conventional designs augment the design capabilities and increase efficiency.

BRIEF DESCRIPTION

The systems and methods generally relate to power conversion and in some embodiments describe circuits and techniques for switching inverter operations and dc-dc conversion.

One embodiment is a push-pull inverter device having two single-ended $EF_2$ inverter sections coupled together with a shared ground and a resonant network that is coupled to at least one load. Each inverter section in this embodiment has a switching section and the resonant network includes a partially shared tunable resonant network section, wherein the shared tunable network section allows independent tuning of an impedance seen by each respective switching section thereby allowing independent tuning of even and odd harmonics of the switching frequency. In one example, the impedance is one value for the even harmonics and one value for the odd harmonics.

The resonator network in one aspect has a first resonator section, a second resonator section, and a third resonator section. The second resonator section has a pair of inductors and a shared capacitor, wherein the inductors are adjusted for odd harmonics and the shared capacitor is adjusted for even harmonics without affecting the odd harmonics. In a different configuration, the second resonator section has a pair of capacitors and a shared inductor, wherein the capacitors are adjusted for odd harmonics and the shared inductor is adjusted for even harmonics without affecting the odd harmonics.

A further embodiment is a dc-dc converter, with two single-ended $EF_2$ inverter sections coupled together with a shared ground and at least one AC input, wherein each inverter section comprises a shared tunable resonant network, and a switching section, and wherein the inverter sections are coupled to an output rectifier section thereby converting the AC input to a DC output, wherein the shared tunable network section provides for independent tuning of an impedance seen by the respective switching section thereby providing independent tuning even and odd harmonics. The rectifier section in one example is a resonant push-pull rectifier section.

Yet a further embodiment is a method for converting electrical power providing at least one voltage source and at least one load, and coupling two single-ended $EF_2$ inverter sections together with a shared ground. The inverter sections are coupled to the voltage source and the load, and the inverter sections comprise a switch and a resonant network wherein the resonant network includes a shared resonant tuning network. The method includes tuning an impedance of each of the inverter sections, wherein the impedance is one value for the even harmonics and one value for the odd harmonics, thereby tuning even and odd harmonics.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

One embodiment provides circuits and techniques useful for switching inverter operation employing a tuned resonant network that operates at radio frequencies and which alleviates many of the deficiencies of the conventional designs. It is especially useful when operation at radio frequencies is desirable or necessary based on the particular application.

In one example, the circuit is developed by extending single-transistor class $EF_2$ inverters into a push-pull circuit with a coupling that provides for independently tuning the harmonics of each section. In one aspect the circuit decouples the tuning of even and odd harmonics of the switching waveform, thus providing additional flexibility in the circuit design. Various embodiments provide for a reduction in the number and size of components, DC flux cancellation in magnetic cores, and a doubling of the ripple frequency.

A further embodiment of the present inverter is based on the class Φconverter that is herein classified as a class $EF_2$ inverter. This inverter has the advantage of low voltage stress compared to class E, as well as the ability to absorb some of the transistor output capacitance into the resonant network.

Another version of the circuit couples the push-pull version of the class $EF_2$ inverter with a push-pull version of a resonant rectifier to form a dc-dc converter.

Figure 1:
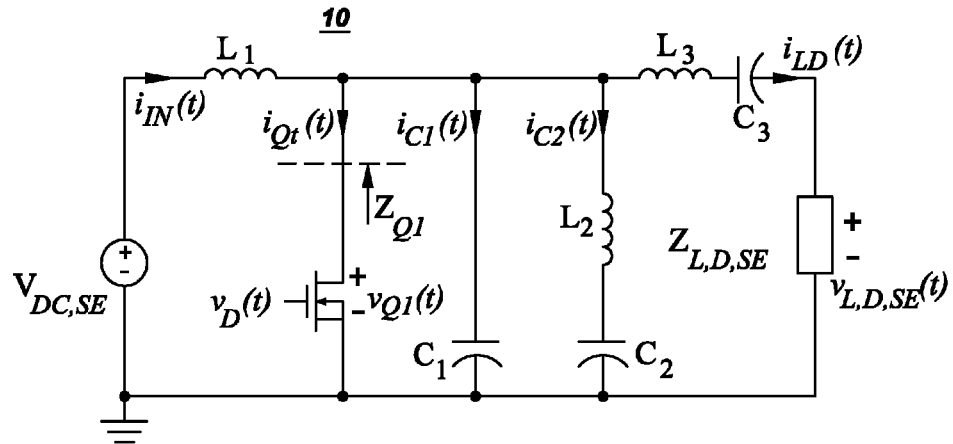
FIG. 1 is a prior art schematic of a Class $EF_2$ inverter.
Figure 2:
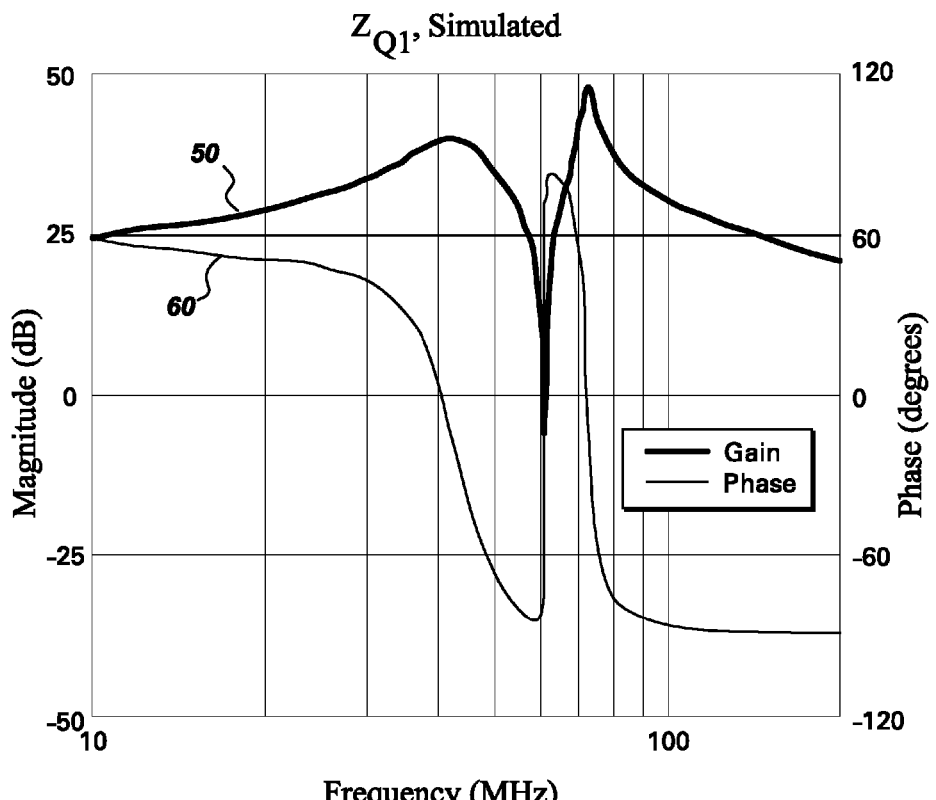
FIG. 2 shows the impedance $Z_{Q1(f)}$ as shown in FIG. 1.
Figure 3:
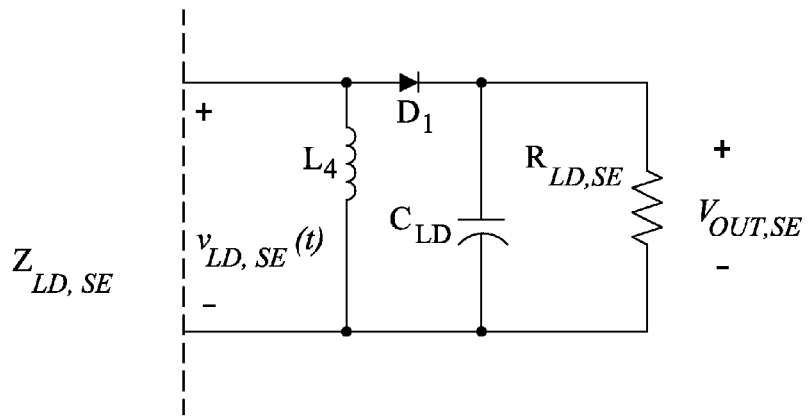
FIG. 3 illustrates a conventional resonant rectifier circuit.
Figure 4:
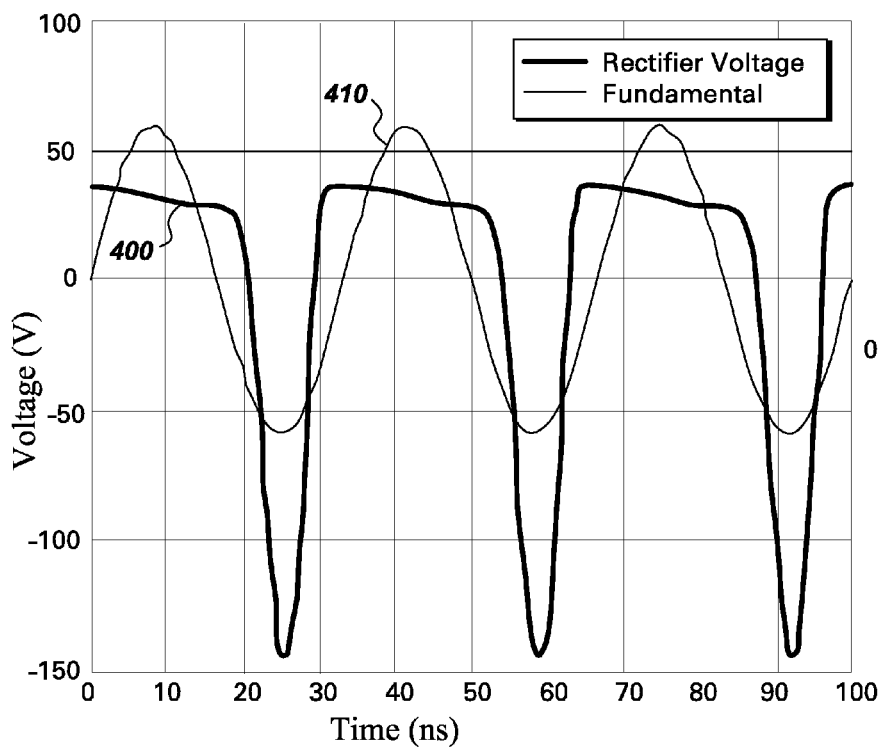
FIG. 4 depicts the standard time domain waveforms for $v_{LD,SE}(t)$ of the input of the rectifier in FIG. 3 showing the full version and the fundamental component.
Figure 5:
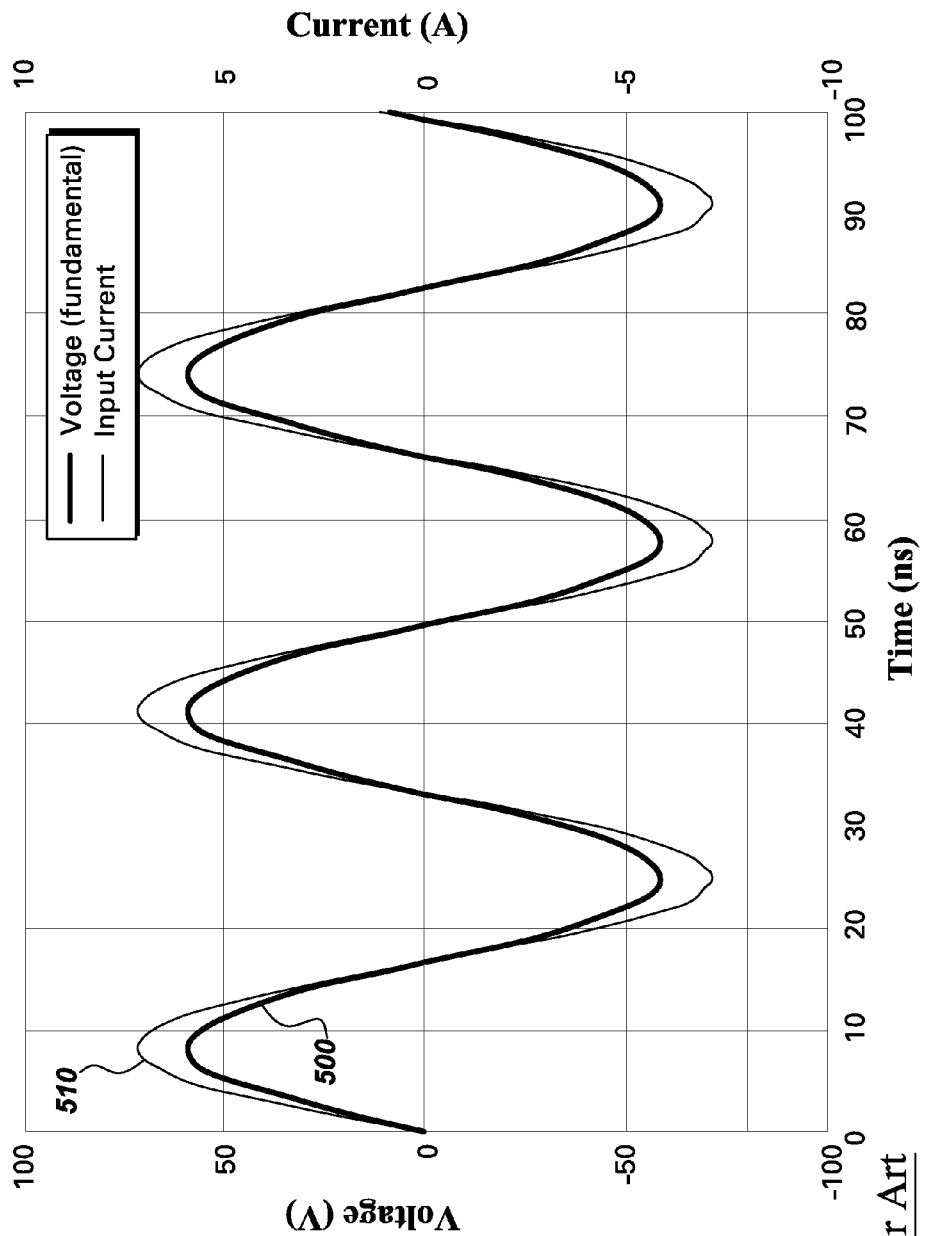
FIG. 5 illustrates the fundamental component waveforms of $v_{LD,SE}(t)$ of the input of the rectifier in FIG. 3 and the corresponding input current.
Figure 6:
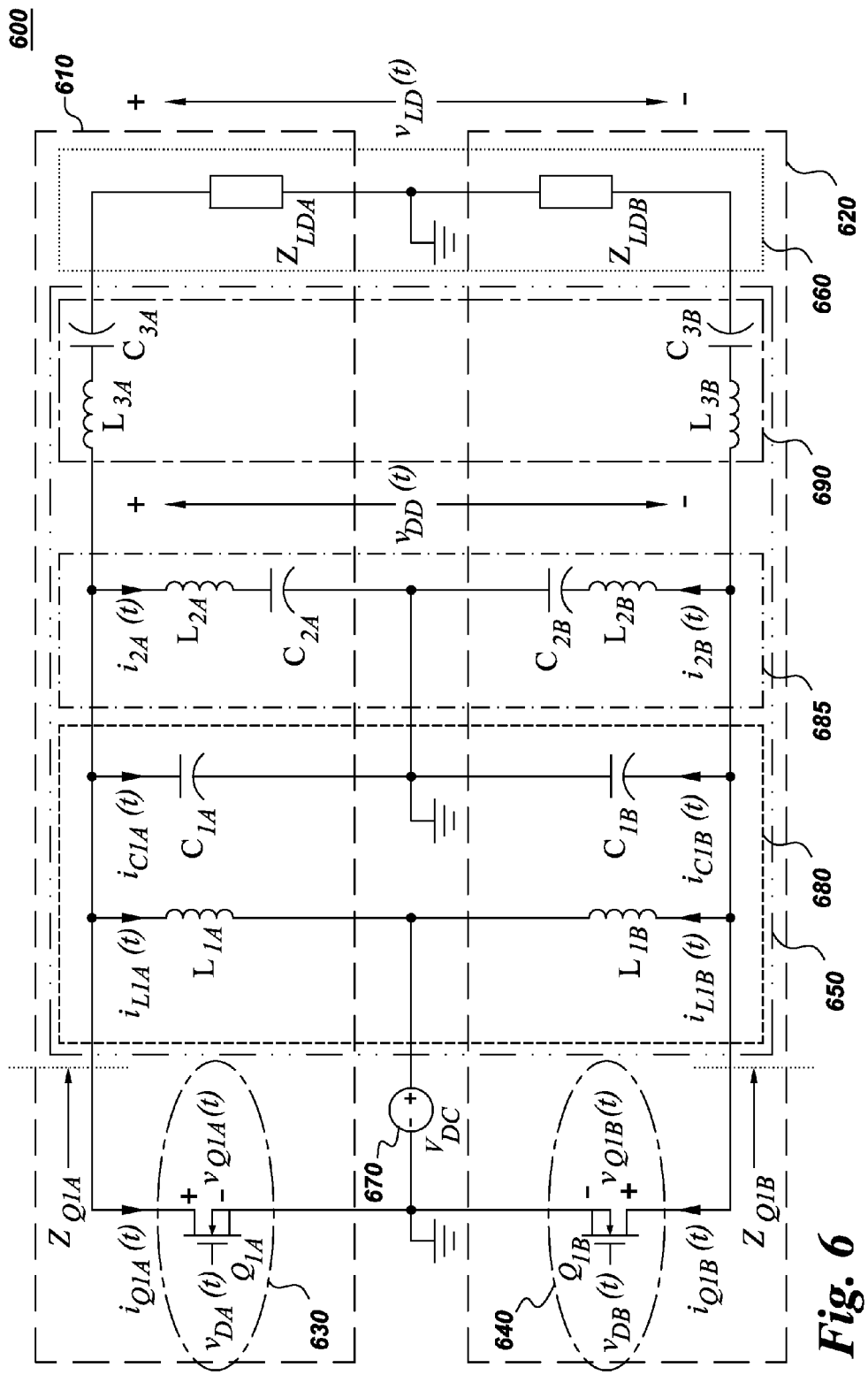
FIG. 6 is a push pull $EF_2$ configured in accordance with one embodiment of the present system.

Referring to FIG. 6, a push-pull version of the class $EF_2$ inverter is depicted. The circuit 600 consists of two single-ended class $EF_2$ inverters 610, 620 (such as shown in FIG. 1)

denoted by using subscripts A and B for each of the two converters, with a common ground reference and with the drive signals $V_{DA}$ and $V_{DB}$ operating 180° out of phase. For the purpose of illustration, assume that the component values remain the same in each converter, e.g. $C_1=C_{1A}=C_{1B}$, $C_2=C_{2A}=C_{2B}$, etc. The output voltage $V_{LD}=2V_{LD,SE}$ and the output power is also doubled over that of the single-ended case. The impedance $Z_{Q1x}$ seen by each transistor, where x can be either A or B, is the same as $Z_{Q1}$ seen in the single-ended case, thus the waveforms for converter A and B will be the same.

Referring again to FIG. 6, each inverter section 610, 620 has a switching section 630, 640 that in this example are transistors $Q_{1A}$, $Q_{1B}$. There is a resonant network section 650 including $L_1$, $C_1$, $L_2$, $C_2$, $L_3$, $C_3$ for each inverter section 610, 620 coupled to a voltage source 670 and to the load 660. In more particular detail, the resonator network 650 in this example includes a first harmonic resonator section 680, a second harmonic resonator section 685 and a third harmonic resonator section 690.

Under normal operation, the converter 600 operates in periodic steady-state, with the fundamental period corresponding to the switching frequency $F_S$. Under this condition, all waveforms are decomposed into integer multiples of $F_S$. For illustrative purposes, it is sufficient to consider the non-negative integers for the harmonics, which are denote by $n \in [0, \infty)$. Furthermore, it is useful to separate the frequency components $F_n$ into the even components $F_e$ and odd components $F_o$.

Under this condition, one of the properties of the push-pull operation is that even frequency components $F_e$, including the DC component $F_0$, appear as common-mode signals, whereas odd frequency components $F_o$, including the fundamental $F_1=F_S$, appear as differential signals. Because the circuit is an inverter, only the AC component of the load is of interest.

Figure 7:
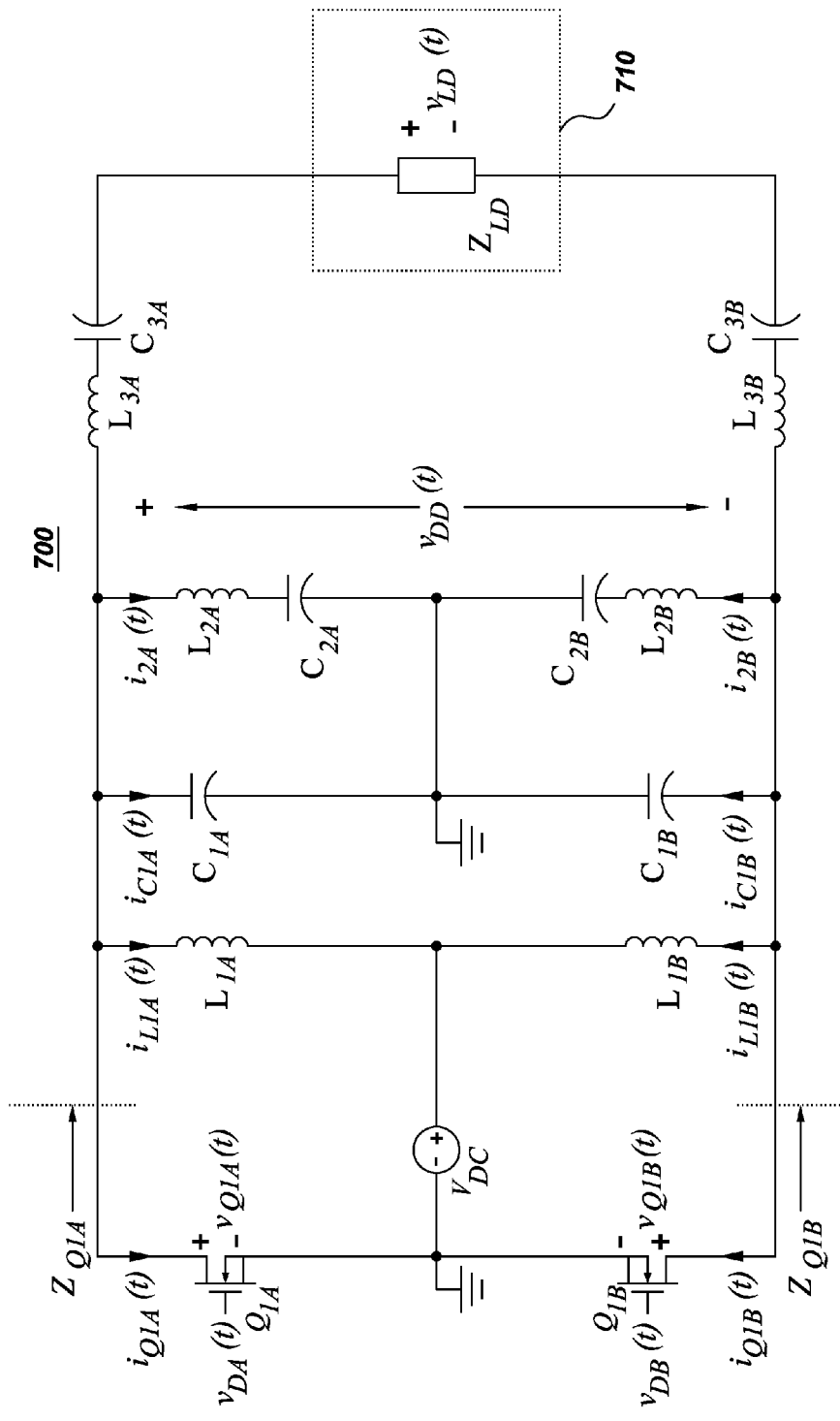
FIG. 7 is a schematic of the push-pull $EF_2$ combining two loads into a single load in accordance with one embodiment.

Referring to the circuit 700 in FIG. 7, since the DC load component is common mode and thus flows in the ground, the ground separating the two loads $Z_{LDA}$ and $Z_{LDB}$ can be disconnected, thereby combining the loads $Z_{LDA}$ and $Z_{LDB}$ into a single load 710 that is $Z_{LD}=Z_{LDA}+Z_{LDB}=2Z_{LD,SE}$. Note that in theory, this would affect the switch impedances $Z_{Q1A}$ and $Z_{Q1B}$ at even frequency components and potentially affect the operation. In practice however, the resonant networks formed by the combinations of $L_{3A}$ and $C_{3A}$, and $L_{3B}$ and $C_{3B}$, attenuate the second and higher harmonics of $F_S$ and thus combining the load resistor into a single resistor as described has minimal effect. For the class $EF_2$ circuit, any effect at the second harmonic is further reduced by the second harmonic shorts formed by $L_{2x}$–$C_{2x}$.

Figure 8:
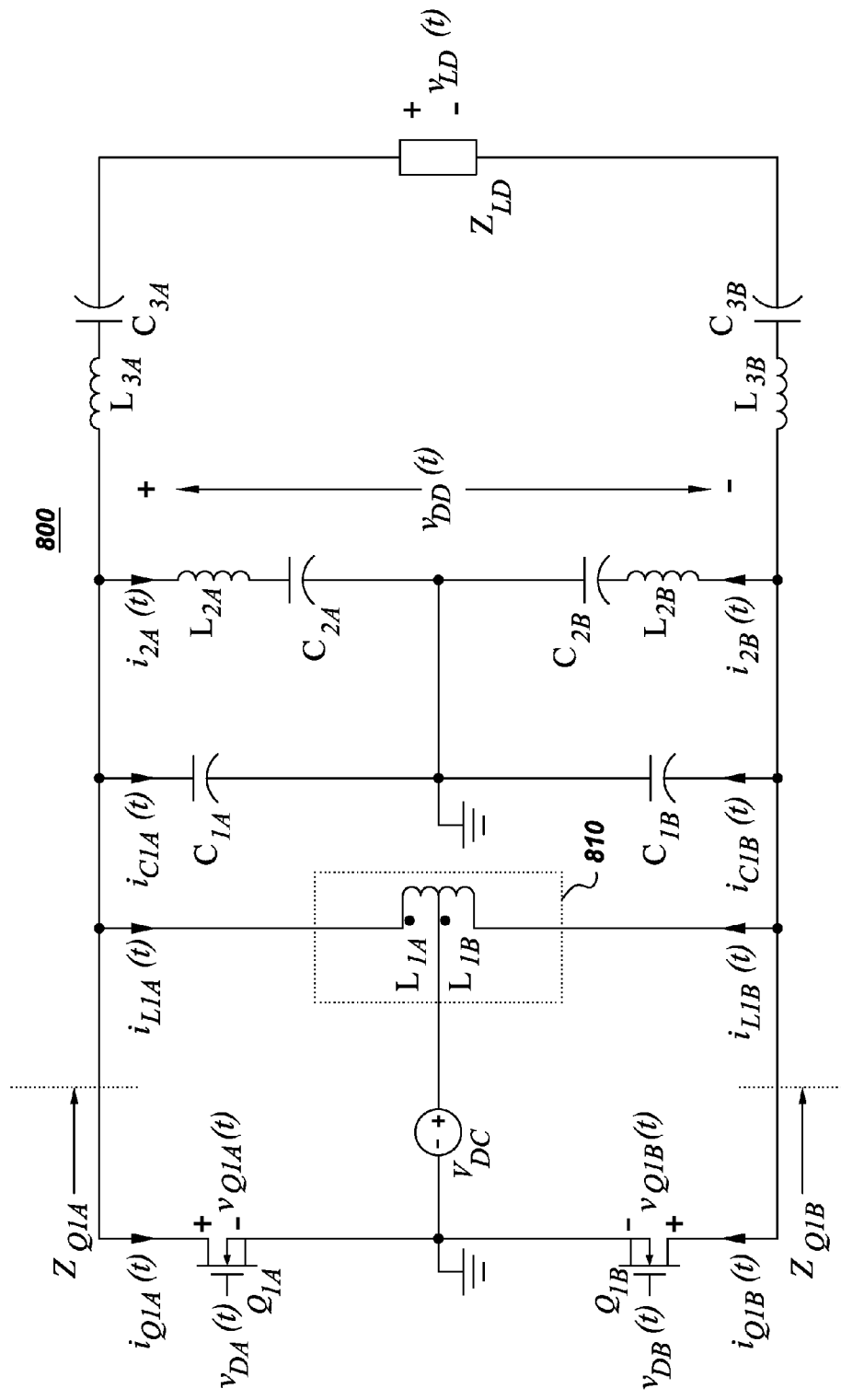
FIG. 8 is a push pull $EF_2$ inverter with a center-tapped inductor for the DC feed inductor configured in accordance with one embodiment of the present system.

FIG. 8 shows the circuit 800 with dc feed inductors $L_{1A}$ and $L_{1B}$ from the first resonator network combined to form a single center-tapped inductor 810. $L_{1A}$ and $L_{1B}$ denote substantially identical coupled windings with a coupling coefficient $k_1$ between 0 and 1. Given that $0 < k_1 < 1$, even frequency components see a contribution from the leakage inductance between windings $L_{1e}=L_{1k}$, and odd frequency components see the sum of the leakage inductance and the mutual inductance $L_{1o}=L_{1k}+L_M$. In the ideal case, $k_1=1$ and the windings are perfectly coupled ($L_{1e}=L_{1k}=0$ and $L_{1o}=L_M$). Then the even harmonic components see a low impedance to ground, and the operation becomes identical to class DE operation. While this is desirable, achieving such good coupling becomes impractical as the frequency increases. In this case, $L_{1o}$ is designed to present the necessary impedance to the odd frequency components for proper operation, and the even frequency components, especially the second, can be controlled by other components, as will be appreciated by the description herein.

One of the advantage of coupling $L_{1A}$ and $L_{1B}$ is that if the windings are on a common magnetic core, the even frequency components of flux cancel in the core. This reduces core losses due to AC components, and because the DC flux component becomes effectively zero, the AC flux swing in the core may be much larger, thereby allowing a smaller core and thus a smaller inductor.

Another advantage of coupling $L_{1A}$ and $L_{1B}$ as described herein is that since the winding are coupled, the odd-mode inductance is a superlinear function of the number of winding turns, approaching a function proportional to the turns squared as $k_1$ approaches unity. Since the odd-mode inductance required is twice that of the single-ended case, less than twice the turns are needed on the common core. This reduces both size and losses in the coupled inductors compared to two uncoupled inductors.

Figure 9:
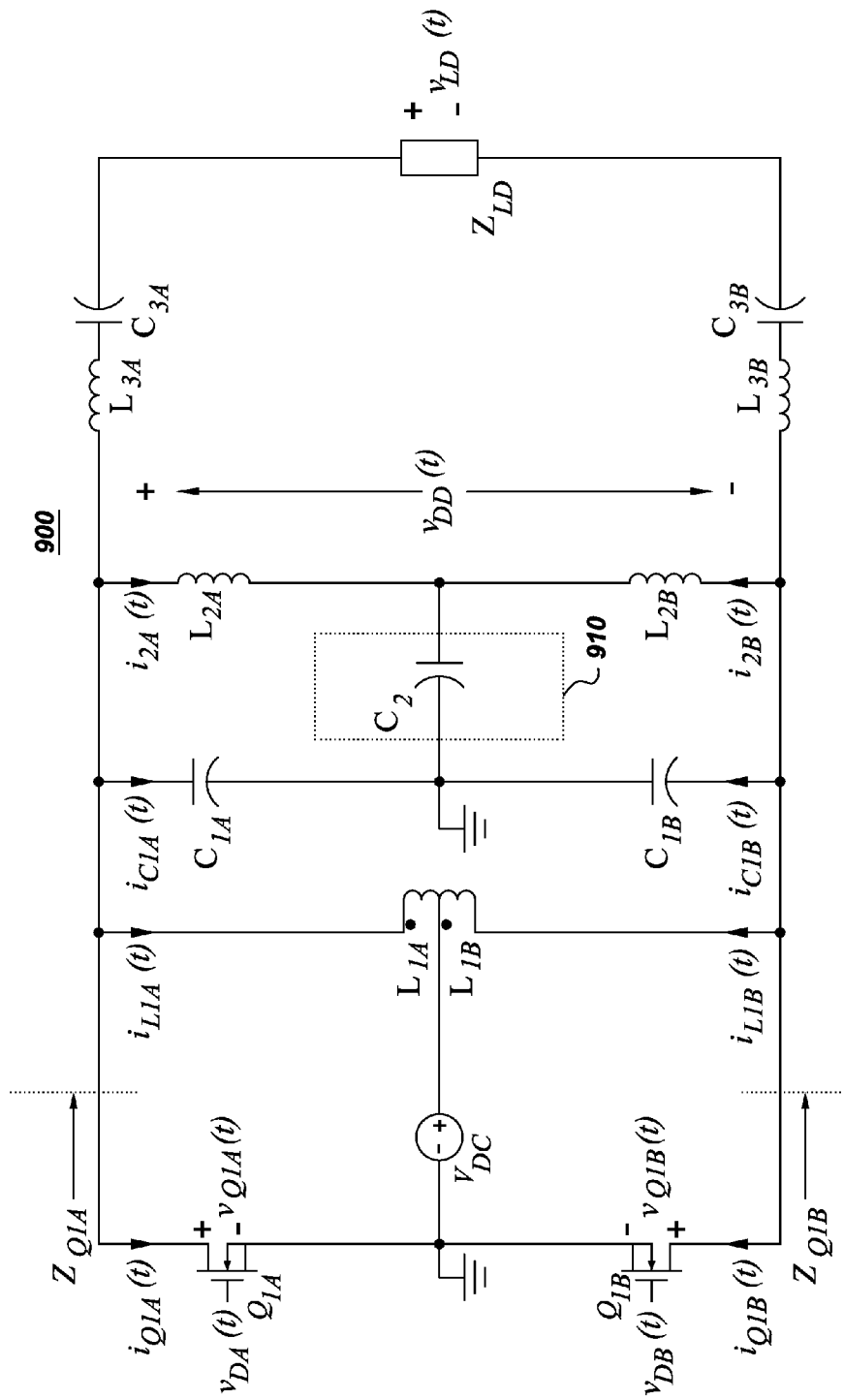
FIG. 9 is a schematic perspective of a push-pull $EF_2$ inverter with a center-tapped inductor for the DC feed inductor and single capacitor second harmonic resonator configured in accordance with one embodiment of the present system.

FIG. 9 shows one embodiment of the present system with circuit 900. For illustrative purposes, each transistor has its own impedance that is developed by the circuit. By the modifications detailed herein, there are no longer two completely separate inverter circuits, and by employing the second harmonic trap it effectively shorts out the second harmonic. It is noted that the impedance seen at the terminal of each transistor is the same. The fundamental and odd harmonics are not affected by the capacitance of the single $C_2$ capacitor thereby providing a mechanism for tuning the inverter circuits.

Referring again to FIG. 9, in this embodiment $C_{2A}$ and $C_{2B}$ are combined into a single capacitor 910 for capacitance $C_2$, by connecting $L_{2A}$ and $L_{2B}$ in series and connecting the center point between them to a capacitance $C_2$ to ground. In the case where $L_{2A}$ and $L_{2B}$ are uncoupled, even frequency components will see an equivalent series resonant network to ground consisting of $C_2$ in series with an inductance $L_{2e}=L_2/2$, where $L_2=L_{2A}=L_{2B}$. Odd frequency components will see an equivalent network consisting an inductance $L_{2o}$, $=L_{2A}+L_{2B}$. Thus, it becomes possible to independently control the effect of the network on even and odd frequency components, while reducing the number of total components.

In particular, the inductors $L_{2A}$ and $L_{2B}$ are chosen to produce the desired effect for the odd frequency components, i.e. the fundamental $F_S$ and the third harmonic $3F_S$, without needing to consider the behavior at the second harmonic $2F_S$. Once the inductor value is selected, capacitor $C_2$ can be adjusted to provide the desired low impedance at the second harmonic $2F_S$, without affecting the transistor impedance at the odd frequency components. Furthermore, because Class EF2 operation requires a low impedance at $2F_S$, which is produced by the network of $L_{2A}$, $L_{2B}$, and $C_2$. This low impedance will be negligibly affected by the impedance contribution of the balance of the components thus they can be adjusted without affecting substantially the impedance at the second harmonic.

Although not shown explicitly in FIG. 9, $L_{2A}$ and $L_{2B}$ may be coupled similarly to $L_{1A}$ and $L_{1B}$ as described herein. By such coupling, it is possible to increase the odd-mode inductance and reduce the even-mode inductance. Increasing the odd-mode inductance reduces odd-mode currents in the second harmonic shorting network, reducing losses due to these currents. Reducing the even-mode inductance allows the use of a larger value of $C_2$ to achieve the second harmonic short, which in turn reduces voltage stress on $C_2$. The description regarding independent tuning of odd and even harmonics apply in this case.

Figure 10:
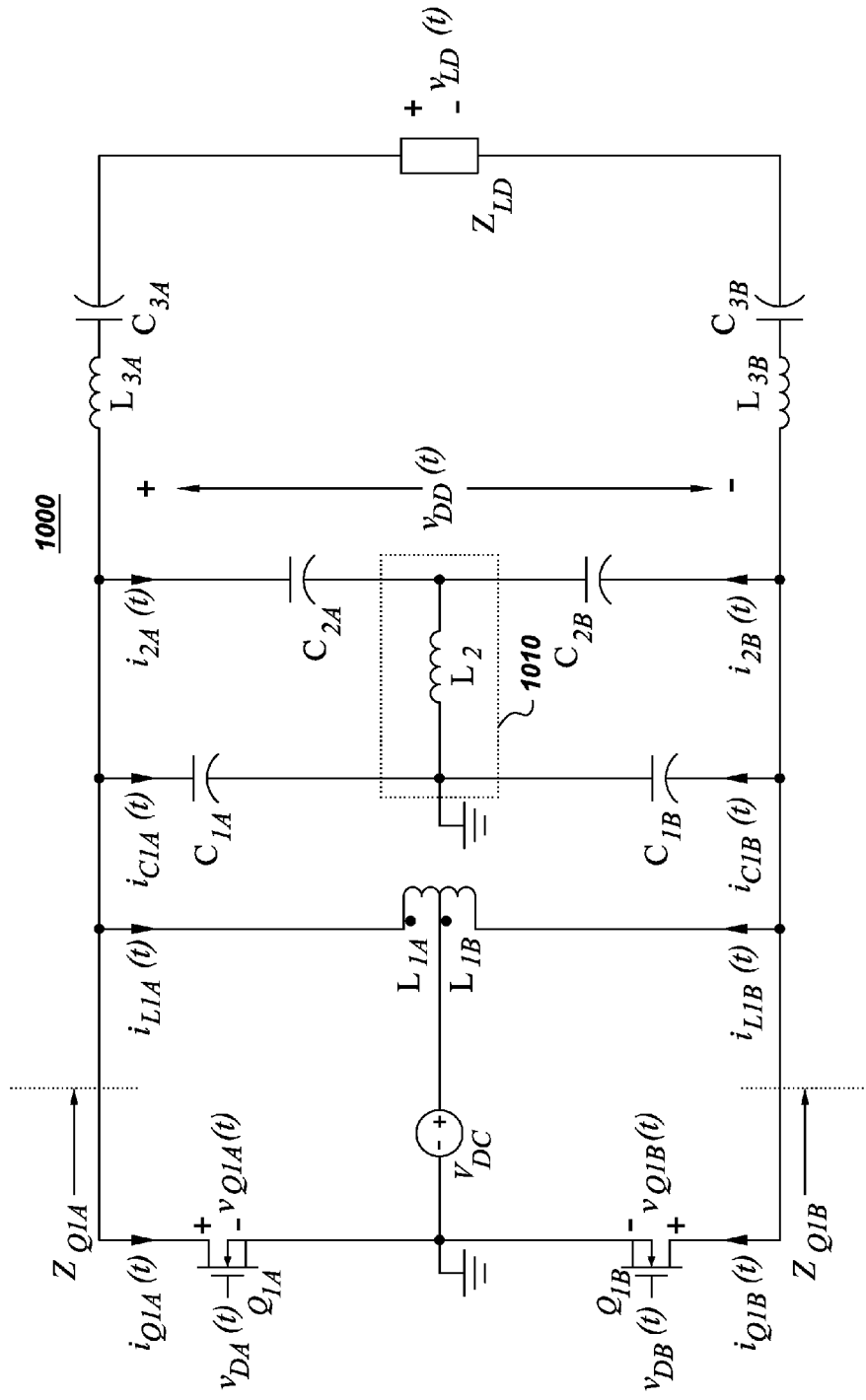
FIG. 10 is a schematic perspective of a push-pull $EF_2$ inverter with a center-tapped inductor for the DC feed inductor and single inductor second harmonic resonator configured in accordance with one embodiment of the present system.

FIG. 10 shows another embodiment of the push-pull configuration 1000 that also allows the roles of $C_2$ and $L_2$ to be reversed, and shows that the second harmonic resonator inductors $L_{2A}$ and $L_{2B}$ are combined into a single inductor 1010 for inductance $L_2$, by connecting $C_{2A}$ and $C_{2B}$ in series and connecting the center point between them to inductance $L_2$ to ground. Even frequency components will see an equivalent series resonant network to ground consisting of $L_2$ in series with a capacitance $C_{2e}=2C_2$, where $C_2=C_{2A}=C_{2B}$. Odd frequency components will see an equivalent network consisting a capacitance $C_{2o}=C_2/2$. Thus, this provides for independently controlling the effect of the network on even and odd frequency components while reducing the number of total components. This advantageously allows another degree of design freedom.

Figure 11:
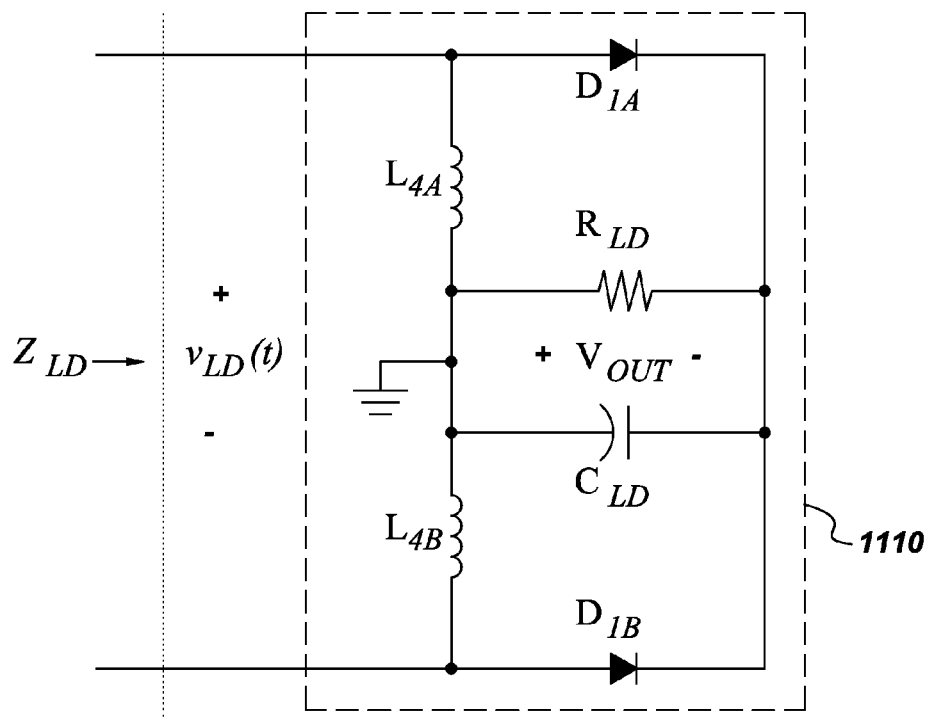
FIG. 11 is a schematic perspective of a push-pull resonator rectifier configured in accordance with one embodiment of a dc-dc converter.

Referring to FIG. 11, while inverters are detailed herein, substituting the load $Z_{LD}$ with a rectifier 1110 converts the AC output to DC, which in turn powers a load $R_{LD}$, wherein a dc-dc converter is designed. As with the inverter, the single-ended rectifier 1110 may be implemented as a push-pull version.

Figure 12:
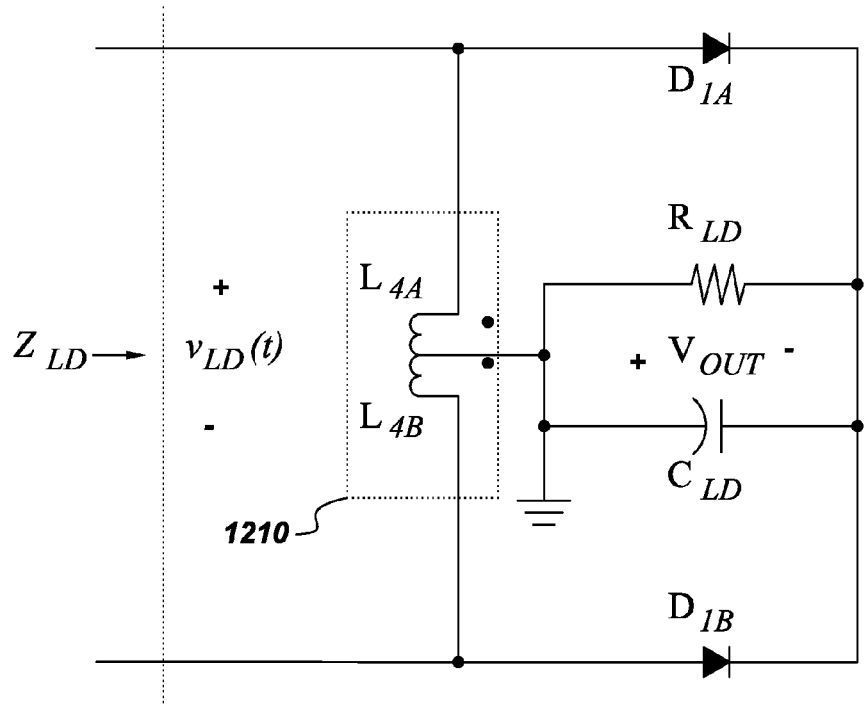
FIG. 12 is a push pull resonant rectifier with center-tapped inductor configured in accordance with one embodiment of the dc-dc converter of FIG. 11.

Referring to FIG. 12, the inductors $L_{4A}$ and $L_{4B}$ of the dc-dc converter of FIG. 11 are implemented with coupled inductors 1210, with the same benefits as described for $L_{1A}$ and $L_{1B}$ on the inverter. This rectifier is a resonant push-pull rectifier.

The independent resonant harmonic adjusting network provided by the system detailed herein has many applications. For example, the circuit and technique can be implemented in RF power amplifiers for the healthcare industry. Another application is for communications transmissions, such as an FM transmitter, wherein the improved efficiency provides cost savings in operations. A further application involves medical applications and operation with a switching frequency up to 300 MHz.

In dc-dc power conversion applications, such as push-pull topologies, the advantages include increasing the switching frequency while minimizing the detriments of the prior attempts. Other features include combining parallel coupled capacitors and splitting inductors, thereby reducing the component count. Another aspect includes lowering the number of windings due to the lower inductance requirements thereby using less precious metals, such as copper. In addition, since there are less windings, the leakage inductance is lower and can be integrated as part of the network.

Some of the advantages of the present system include the manufacturability of power processors that are much smaller, such as 2-10 times smaller due to the innovative structure. One feature that distinguishes the design of the present system is the ability to cancel dc current in the inductors of the resonant networks. Another feature includes the ability to independently control impedances seen by the transistors for even and odd harmonics. Another distinction includes an increase of the input and output ripple frequency, such as doubling the input and output ripple frequency, thereby reducing filtering requirements.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A push-pull inverter device, comprising:
    two substantially identical single-ended $EF_2$ inverter sections coupled together with a shared ground and a resonant network that is coupled to at least one load, wherein each inverter section comprises a switching section, wherein the switching sections are switched at a same switching frequency, but with a phase difference of about 180 degrees,
    and wherein the resonant network is partially shared and independently tuned to an impedance seen by each respective switching section, thereby providing independent tuning of even and odd components of the switching frequency.

2. The device according to claim 1, wherein said resonant network comprises a first resonator section, a second resonator section, and a third resonator section.

3. The device according to claim 2, wherein the second resonator section comprises a pair of inductors and a shared capacitor, wherein the inductors are adjusted to control the impedance at odd harmonics and the shared capacitor is adjusted to control the impedance at even harmonics without affecting the impedance at odd harmonics.

4. The device according to claim 2, wherein the second resonator section comprises a pair of capacitors and a shared inductor, wherein the capacitors are adjusted to control the impedance at odd harmonics and the shared inductor is adjusted to control the impedance at even harmonics without affecting the impedance at odd harmonics.

5. The device according to claim 2, wherein a pair of inductors in the first resonator section are combined to form a center-tapped single inductor.

6. The device according to claim 2, wherein components in said first section, and said second section have the same value.

7. The device according to claim 1, wherein the two inverter sections are labeled A and B and said at least one load is combined such that $Z_{LD}=Z_{LDA}+Z_{LDB}$, wherein $Z_{LD}$ is the combined load, $Z_{LDA}$ is the load for inverter section A, and $Z_{LDB}$ is the load for inverter section B.

8. The device according to claim 1, wherein said switching section operates at a switching frequency $F_S$ wherein $F_S$ is a frequency in the range of 10 MHz to 300 MHz.

9. The device according to claim 1, wherein frequency components $F_n$ are separated into even components $F_e$ and odd components $F_o$, said even frequency components appear as common-mode signals and said odd frequency components appear as differential signals.

10. The device according to claim 1, wherein each said switching section is a transistor.

11. A dc-dc converter, comprising:
    two substantially identical single-ended $EF_2$ inverter sections coupled together with a shared ground and at least one AC input, wherein each inverter section comprises a shared tunable resonant network, and a switching section, and wherein said inverter sections are coupled to an output rectifier section thereby converting the AC input to at least one DC output,
    wherein the switching sections are switched at about a same switching frequency, but with a phase difference of about 180 degrees,
    wherein the shared tunable resonant network is independently tuned to an impedance seen by the respective switching section thereby providing independent tuning of even and odd components of the switching frequency.

12. The converter according to claim 11, wherein the rectifier section is a resonant push-pull rectifier section.

13. The converter according to claim 11, wherein said resonant network comprises a first resonator section, a second resonator section, and a third resonator section.

14. The converter according to claim 13, wherein the second resonator section comprises a pair of inductors and a shared capacitor, wherein the inductors are adjusted to control the impedance at odd harmonics and the shared capacitor is adjusted to control the impedance at even harmonics without affecting the impedance at odd harmonics.

15. The converter according to claim 13, wherein the second resonator section comprises a pair of capacitors and a shared inductor, wherein the capacitors are adjusted to control the impedance at odd harmonics and the shared inductor is adjusted to control the impedance at even harmonics without affecting the impedance at odd harmonics.

16. A method for converting electrical power, comprising:
providing at least one voltage source and at least one load;
coupling two single-ended $EF_2$ inverter sections together with a shared ground, wherein said inverter sections are coupled to said voltage source and said load, said inverter sections comprising a switch and a shared resonant tuning network; and
tuning an impedance of each of said inverter sections, wherein the impedance is one value for the even harmonics and one value for the odd harmonics, thereby tuning even and odd harmonics.

17. The method according to claim 16, wherein tuning the impedance comprises adjusting components of the shared resonant tuning network for odd harmonics and then adjusting for even harmonics without affecting the odd harmonics.

18. The method according to claim 16, wherein the single-ended $EF_2$ inverter sections are substantially identical.

19. The method according to claim 16, wherein the switching sections are switched at about a same switching frequency, but with a phase difference of about 180 degrees.

20. The method according to claim 16, said shared resonant tuning network comprising a first resonator section, a second resonator section, and a third resonator section, wherein the second resonator section comprises a pair of inductors and a shared capacitor, further comprising adjusting the inductors to control an impedance at odd harmonics and adjusting the shared capacitor to control an impedance at even harmonics without affecting the impedance at odd harmonics.

21. The method according to claim 16, said shared resonant tuning network comprising a first resonator section, a second resonator section, and a third resonator section, wherein the second resonator section comprises a pair of capacitors and a shared inductor, further comprising adjusting the capacitors to control an impedance at odd harmonics and adjusting the shared inductor to control an impedance at even harmonics without affecting the impedance at odd harmonics.

* * * * *